United States Patent [19]

Carrington et al.

[11] 4,260,740

[45] Apr. 7, 1981

[54] CARBOXYLATED CELLULOSE ION-EXCHANGE MATERIALS

[75] Inventors: Roy Carrington, Margate; Michael C. Hall, Stodmarsh, Nr. Canterbury, both of England

[73] Assignee: Pfizer Inc., New York, N.Y.

[21] Appl. No.: 83,355

[22] Filed: Oct. 10, 1979

[30] Foreign Application Priority Data

Oct. 11, 1978 [GB] United Kingdom ............... 40145/78

[51] Int. Cl.³ .................... B01D 39/00; B01J 39/00; C02F 1/42; C08B 3/12
[52] U.S. Cl. .................... 536/63; 210/500.1; 210/688; 424/141; 424/294; 521/25; 521/27; 521/28; 521/30
[58] Field of Search ...................... 536/63; 521/25, 27, 521/28, 30; 424/141, 294; 210/38 B, 500 R

[56] References Cited

U.S. PATENT DOCUMENTS 2,759,787  8/1956  Touey et al. ........................... 536/63
3,573,277  3/1971  Grant ..................................... 521/30

OTHER PUBLICATIONS

D. D. Gagliardi et al., *American Dyestuff Reporter*, Apr. 15, 1963, pp. 74–77.

*Primary Examiner*—Ronald W. Griffin
*Attorney, Agent, or Firm*—Connolly & Hutz

[57] ABSTRACT

A process for preparing a carboxylated cellulose ion exchange material which comprises heating a mixture of cellulose and citric, isocitric or aconitic acid at a temperature of from about 100° to 160° C. while removing water, and then treating the product with aqueous alkali at a pH of 8 to 11 to hydrolyze cross-linked acid residues; carboxylated cellulose ion exchange materials prepared by the process and their use in removing heavy-metal ions from aqueous solutions such as in industrial effluent treatment and precious metal recovery.

15 Claims, No Drawings

CARBOXYLATED CELLULOSE ION-EXCHANGE MATERIALS

BACKGROUND OF THE INVENTION

1. Field of the Invention

This invention relates to ion exchange materials and is particularly concerned with carboxylated cellulose products and their salts having ion exchange properties and with a process for their preparation. The products have particular application in scavenging heavy metal ions from aqueous solution for example in effluent treatment and in precious metal recovery.

2. Description of the Prior Art

Cellulose esters containing free carboxyl groups are well known, in particular the esterification of cellulose with citric acid has been described as a method of textile finishing to improve crease resistance in cellulosic fabrics (Gagliardi and Shippee, *American Dyestuff Reporter*, Apr. 15, 1963, 74). That such materials exhibited ion exchange properties was noted. U.S. Pat. No. 2,759,787 also describes the preparation of insoluble cellulose citrates by the reaction of citric acid and cellulose. The products are said to be useful as absorbents for high molecular weight materials. Such products have not, however, found general application as ion exchange materials because of their low ion exchange capacity.

SUMMARY OF THE INVENTION

It has now been found that when cellulose is reacted with certain polycarboxylic acids in the process of the invention, water insoluble carboxylated cellulose ion exchange materials are obtained having a high degree of incorporation of acid, a high proportion of free carboxyl groups, excellent stability and a high ion exchange capacity. We have further discovered that the products of the invention exhibit a selectivity for heavy metal ions, e.g. copper, nickel and zinc, in the presence of calcium ions which makes the products of particular value, for example, in the treatment of industrial effluents. Thus, according to the invention, a process is provided for the preparation of a carboxylated ion exchange material which comprises the steps of a. heating a mixture of cellulose and polycarboxylic acid selected from the group consisting of citric, isocitric and aconitic acid, said mixture containing from about 30 to 70 percent by weight of said acid, at a temperature of from about 100° to 160° C. while removing water therefrom until the cellulose has reacted with at least 20 percent of its own weight of acid; and b. treating the product with aqueous alkali at a pH of from about 8 to 11 until the ion exchange capacity of the material relative to cupric ions is at least 1.5 milliequivalents per gram.

The most preferred polycarboxylic acid is citric acid. Preferred forms of cellulose are sawdust and waste newsprint. Other especially preferred process conditions for the first step include the use of mixtures of cellulose and polycarboxylic acid which contain from about 40 to 60 percent by weight of acid, reaction temperatures of from 130° to 150° C., reduced pressure, and use as starting material of a mixture of polycarboxylic acid and cellulose having a moisture content of less than 5 percent. In another preferred embodiment of the invention, the first step of the instant process is carried out in the presence of a catalytic amount of an acidic catalyst selected from the group consisting of phosphoric acid, sulfamic acid and aluminum sulfate, the latter being especially preferred. In the second step, preferred alkalis are sodium carbonate and sodium bicarbonate.

The invention further provides the carboxylated ion exchange materials prepared by the above process. Especially preferred materials of the invention are those having an ion exchange capacity of from about 1.5 to 3.5 milliequivalents per gram, relative to cupric ions.

The invention further provides a method for removing heavy metal ions from an aqueous solution of such ions by contacting the solution with a carboxylated cellulose ion exchange material prepared by the instant process.

DETAILED DESCRIPTION OF THE INVENTION

Various forms of cellulose may be used as starting material for the process; thus for example, refined cellulose powder may be used or crude forms of cellulose such as wood-pulp, sawdust, wood-chips or waste newsprint. Sawdust and waste-newsprint are preferred sources of cellulose on grounds of cost and because of the desirable ion exchange properties of the products obtained from these materials.

Preferred polycarboxylic acids for the process of the invention are citric, isocitric, and aconitic acid. The amount of citric, isocitric or aconitic acid used may vary between 30 and 70 percent of the total weight of the mixture of cellulose and acid before heating. The use of substantially less than 30 percent of polycarboxylic acid leads to products having too low an incorporation of acid and such products do not have useful ion exchange capacities. Levels of polycarboxylic acid higher than 70 percent may be employed, but we have found that in practice there is little advantage to be gained when the acid content of the mixture exceeds that amount. For optimum incorporation of acid, the preferred amount of polycarboxylic acid in the mixture is from 40 to 60 percent by weight of the mixture. Citric acid is an especially preferred polycarboxylic acid for use in the process. The citric acid may be used as anhydrous citric acid or in the form of its monohydrate. The citric acid employed can also be in a crude form, such as crude citric acid obtained directly from a fermentation broth.

The mixture of cellulose and citric, isocitric or aconitic acid may be prepared in a number of ways. For example, the mixture can be prepared using cellulose and the acid in powder form and using conventional solid/solid mixing techniques. Alternatively, an aqueous solution of the acid may be sprayed onto cellulose in a suitably agitated dryer. Preferably, however, the cellulose, sawdust or newsprint etc, is dispersed is an aqueous solution of the acid to form a slurry. The slurry is stirred and the wet mass is then dried, for example, by spray drying or by drying on trays in an oven or on a heated roller. The dried product may be ground or milled as required to give a free-flowing powder.

For carrying out the invention process, the moisture content of the mixture of cellulose and polycarboxylic acid should be low prior to and during the heating stage of the process. Thus, it is preferred that the mixture should contain less than 5 percent by weight of water and, more preferably, less than 2 percent water by weight. The mixture of cellulose and polycarboxylic acid may therefore have to be dried, e.g. by heating at a temperature below 100° C. to reduce its water content to below 5 percent by weight prior to heating in the range 100° to 160° C. In the instant process water is formed by reaction between the carboxyl groups of the acid and the hydroxyl groups of the cellulose and this water must be removed from the mixture to force the reaction toward completion. While removal of such water is achieved at atmospheric pressure under the conditions of the instant process, it is preferably achieved by carrying out the heating step under reduced pressure; e.g. at below about 150 mm. of mercury, especially below about 50 mm. mercury. The pressure may be maintained at the required level by means of a vacuum pump or steam ejector. Alternatively a purge of air or nitrogen may be used to remove water vapor from the reaction vessel as it is formed. Operating under vacuum or with a nitrogen purge has the further advantage of reducing oxidation due to the presence of air which can lead to discoloration of the product especially at higher temperatures in the range.

The temperature used during the heating stage is preferably in the range of about 100° to 160° C., and a temperature of from about 130°–150° C. is especially preferred as lower temperatures lead to prolonged reaction times while higher temperatures tend to lead to degradation of the product. Lower temperatures within the preferred range may be employed with aconitic acid whereas reactions with citric acid generally require somewhat higher temperatures.

The period of time required to achieve sufficient reaction between the cellulose and the acid will, of course, depend upon a multiplicity of factors such as, for example, the nature of the starting material, the proportion of acid present and the type of apparatus used for the heating step as well as the precise temperature employed. In practice, the heating is continued for a time sufficient to ensure that the cellulose has reacted with at least 20 percent of its own weight of polycarboxylic acid. This may be determined from the weight gain of the reaction product after washing to remove unreacted acid, and may be estimated at any point during the heating process by removing a sample of the reaction mixture and measuring the proportion of water-soluble material remaining in the mixture. The heating may be terminated when the required amount of the polycarboxylic acid initially present has reacted, but is preferably continued until there is no further reaction. The time taken to achieve this will vary with the proportion of acid initially present. Thus, mixtures containing higher levels of acid react faster initially but take longer to reach the stage where there is no further incorporation of acid. In practice, however, we have found that when a temperature of 140° C. is employed and citric acid is used at levels of 40–60 percent, by weight, a period of 2 to 6 hours is generally sufficient to achieve maximum incorporation of the citric acid. The amount of unreacted polycarboxylic acid remaining will naturally depend of the proportion initially present; at higher initial polycarboxylic acid contents, it is to be expected that there will be more unreacted acid. We have found, however, that under appropriate conditions, even with a mixture initially containing 60 percent by weight of citric acid, it is possible to incorporate well over half of the citric acid into the cellulose to give a citrated cellulose product with a citric acid content of up to 50 percent of the weight of the product.

The presence of a catalyst during the heating stage has been found to be beneficial and enables the higher levels of acid incorporation to be achieved as well as giving products with improved ion exchange capacities. The use of a catalyst is especially valuable when the cellulose source is sawdust or newsprint. Suitable catalysts are acidic materials; e.g. phosphoric acid, sulfamic acid or aluminum sulfate, the latter being especially preferred. The catalyst may be added to the mixture at a level of from about 0.1 to 1 percent based on the total weight of the mixture, but, in the case of aluminum sulfate, a level of about 0.2 percent by weight is preferred.

If desired, the product obtained after the mixture has been heated as described may be washed with water to remove unreacted polycarboxylic acid, catalyst and any water soluble by-products. This washing step may, however, be omitted, particularly where the residual levels of polycarboxylic acid are low, the product being treated directly with alkali in the next stage of the process.

The hydrolysis step is an essential part of the process of the invention and gives a product having a much increased ion exchange capacity towards heavy metal ions. It is believed that during the hydrolysis step, cross-linked polycarboxylic acid residues are hydrolyzed and a product results wherein each polycarboxylic acid moiety is bound to the cellulose by a single ester bond while the other two carboxyl groups are free. Thus, depending on the amount of polycarboxylic acid incorporated into the cellulose, products having ion exchange capacities ranging from about 1.5 to 3.5 milliequivalents per gram (measured as cupric ions) are achieved.

The hydrolysis step is generally performed by stirring the product from the heating stage in dilute alkali at a pH of from about 8 to 11. Suitable alkalis are the salts of weak acids such as, for example, sodium bicarbonate, sodium carbonate, sodium tetraborate, sodium acetate or ammonium acetate. Alternatively a strong base such as sodium hydroxide may be used, the pH of the solution being maintained in the desired range by means of an automatic titration apparatus, for example, a pH-stat. The optimum pH range is from about 8.5 to 9. If the pH of the solution is allowed to rise too far, for example, above pH 11, polycarboxylic acid is lost from the product. Preferred alkalis are sodium carbonate and sodium bicarbonate, since the pH of their aqueous solutions naturally falls into the desired pH range. After the initial uptake of sodium ions, there is a slower uptake believed to be due to hydrolysis of cross-linked acid residues and this correlates with the increase in the ion exchange capacity of the product for cupric ions. The pH is maintained in the desired range by the addition of further sodium carbonate or bicarbonate if required, but generally a sufficient excess (e.g. a 10 percent excess) can be estimated based on the acid content of the material.

The alkali treatment is continued until the ion exchange capacity of the product towards cupric ions is at least 1.5 milliequivalents/g., but is preferably continued until there is no further increase in the ion exchange capacity of the product. This is generally indicated when there is no further uptake of alkali from solution. The amount of alkali in solution is readily determined by titration of a sample with an acid using an appropriate indicator. In practice we have found that, at room temperature, a period of from about one to 24 hours is generally sufficient. Naturally the reaction time may be shortened by heating, but care must be taken to ensure that the hydrolysis does not lead to loss of polycarboxylic acid from the product. The product is then collected by filtration, washed and dried to give the carboxylated cellulose as the sodium salt. Naturally other alkali metal salt forms may be prepared using the appropriate alkali.

The ion exchange capacity of the product for cupric ions is assessed by weighing out a sample of the dried product and adding it to a known volume of a solution containing a knwon concentration of cupric ion, e.g. copper (II) sulphate at 500 p.p.m. The suspension is stirred for two hours and filtered. The solid is washed and the filtrate made up to a known volume and the residual cooper concentration is measured by a standard analytical technique, e.g. by gravimetric determination or by atomic absorption spectroscopy. The quantity of cooper absorbed by the product is calculated from the amount of copper remaining in solution. The carboxylated celluloses having ion exchange capacities for heavy metal ions of from 1.5 to 3.5 milliequivalents/g. prepared by the process of this invention are novel products having ion exchange capacities not previously attainable in carboxylated cellulose products.

The carboxylated cellulose ion exchange materials of the invention are weakly acidic ion exchange materials of value in a variety of applications, e.g. in antibiotic recovery, but we have found that the materials are capable of removing heavy metal ions, e.g. copper, zinc, nickel, cadmium, mercury, silver, and the like from aqueous solutions and are thus particularly useful in such operations as scavengers for heavy metal ions in industrial effluents, in various water treatment processes and in the recovery of precious metals, e.g. in the recovery of silver from silver containing residues. We have further discovered that the carboxylated cellulose materials of the invention exhibit a selectivity for heavy metal ions in the presence of calcium ions. This makes the products of particular value in hard water areas or in treating, for example, electroplating effluents where the addition of lime is used to reduce levels of metal ions.

Thus, the invention also provides a method of removing heavy metal ions from aqueous solutions which comprises contacting the solution with a carboxylated cellulose ion exchange material prepared by the process of the invention.

The ion exchange materials of the invention which have been used to remove heavy metal ions are readily regenerated by treatment with dilute acid, for example, by stirring with aqueous 5% hydrochloric acid or aqueous 0.8% sulphuric acid for 2 hours, to give the product in the free acid form. Reconversion to the salt form (e.g. the sodium salt) is readily achieved by stirring with sodium bicarbonate as previously described or by gradual addition of the calculated quantity of sodium hydroxide. Other salt forms may be prepared by addition of the appropriate base, e.g. the ammonium salt may be prepared by addition of aqueous ammonium hydroxide. The carboxylated cellulose materials of the invention have excellent stability and can be recycled indefinitely with no loss of ion exchange capacity. A further desirable and unexpected property of the carboxylated cellulose ion exchange materials of the invention is their very fast ion exchange kinetics. We have fouud that, particularly the products derived from cellulose powder or newsprint, have an exchange kinetic half-life of 10-20 seconds. This makes such products of particular value in column and flow applications and where large volumes of effluent are being treated.

The process for the preparation of the instant carboxylated cellulose ion exchange materials and their use in ion exchange processes is further illustrated by the following examples: EXAMPLE 1

(A) A mixture of waste newsprint (1.00 kg.), citric acid monohydrate (1.50 kg.) and aluminum sulphate hydrate (5 g.) was stirred with water (10 liters) in a stainless steel container. After several hours the wet mass was dried in a forced air oven at 70° C. to a water content of less than 2% by weight and the product was milled and sieved through a 1 mm. mesh sieve.

(B) A proportion of the product from (A) (600 g.) was stirred and heated under a pressure of 110 mm. mercury (maintained by a vacuum pump) in a 5 liter vessel. A temperature of 140° C. was reached after 6 hours and was maintained for a further 2 hours. At the end of this period, 73.2% of a small sample of the product was found to be insoluble in water. The reaction product (544 g.) was suspended in water and after three hours the product was collected by filtration, washed with a little water and dried. The yield (398 g.) indicated that the cellulose had reacted with about 65% of its weight of citric acid.

(C) The residue from (B) was suspended with stirring in water (1 liter) and a solution of sodium bicarbonate (300 g.) in water (3 liters) was added in 10 equal increments at 10 minute intervals. A further 300 g. sodium bicarbonate was then added and the suspension was stirred for a further 3 hours and allowed to stand overnight at room temperature. The product was collected by filtration, washed with water (3×1.5 liters) and dried in a forced air oven at 85° C. for 36 hours. The final product (397 g.) had an ion exchange capacity towards cupric ions of 99.3 mg. copper/g. (3.13 milliequivalents/g.). When the above procedures are carried out in the same manner, but employing equivalent amount of isocitric acid or aconitic acid in place of citric acid, the results are substantially the same.

EXAMPLE 2

Waste newsprint (10.0 g.) was macerated in 200 ml. deionized water containing 10 g. citric acid monohydrate for 20 minutes. The mixture was dried at 70° C. overnight and the product milled and sieved through a 100 mesh screen. The fine powder was reacted at 145° C. under a vacuum of 50 mm. mercury for four hours to give a product (19.5 g.) which was 87% insoluble in water. The product was cooled and suspended with stirring in 1M sodium bicarbonate (150 ml) for 1 hour at room temperature. After filtration the product was washed until neutral and dried at 75° C. The product (17.1 g.) had a copper (II) ion exchange capacity of 2.4 milliequivalents/g.

EXAMPLES 3–8

The general procedure of Example 2 was followed using various proportions of newsprint and citric acid. Heating was performed under a vacuum of 50 mm. mercury at various temperatures and for various times. The following Table gives the conditions used, the yield and degree of insolubility of the product after the heating stage and the ion exchange capacity of the product (relative to cupric ions) after the hydrolysis stage.

| Ex. | News-print, % | Citric Acid, % | Temp-era-ture, °C. | Time, hours | Yield % | % In-sol-uble | Ion exchange capacity after hydro-lysis, milli-equiva-lents/g. |
|---|---|---|---|---|---|---|---|
| 3 | 40 | 60 | 140 | 2.0 | 95.8 | 53.5 | 2.62 |
| 4 | 40 | 60 | 150 | 2.0 | 94.3 | 55.0 | 2.84 |
| 5 | 50 | 50 | 150 | 2.5 | 92.5 | 65.0 | 2.75 |
| 6 | 50 | 50 | 160 | 2.5 | 80.0 | 78.0 | 2.87 |
| 7 | 60 | 40 | 140 | 2.5 | 95.4 | 79.0 | 2.33 |
| 8 | 60 | 40 | 160 | 2.0 | 85.2 | 90.5 | 2.60 |

EXAMPLE 9

(A) Sawdust (20 g.) was added to a solution of citric acid monohydrate (20 g.) and aluminum sulphate hydrate (0.08 g.) in water (400 ml.). The mixture was heated to boiling and stirred for 2 hours until it had the consistency of a paste, it was then dried in an oven at 90° C. for 16 hours to a moisture content of less than 2%.

(B) Fifteen grams of the product from (A) was stirred and heated in a glass flask at 150° C. under a pressure of 50 mm. mercury for 2 hours to yield 11.4 g. of a product 95.6% insoluble in water indicating that the sawdust had reacted with 44% of its weight of citric acid.

(C) The product from (B) (10.25 g.) was suspended in 300 ml. of 1M sodium bicarbonate and stirred overnight at room temperature. The solid material was collected by filtration, washed several times with water and dried at 60° C. in a forced air oven for 48 hours. The product (9.85 g.) had a cupric ion exchange capacity of 2.85 milliequivalents/g.

EXAMPLES 10-13

The procedure of Example 9 was followed using various proportions of sawdust and citric acid and heating for 3 hours at 140° C. and 50 mm. mercury pressure. The following Table gives the proportions used, the yield and the degree of insolubility of the product after the heating stage and the ion exchange capacities of the products (relative to cupric ions) both before and after the hydrolysis stage.

| Ex. | Saw-dust, g. | Citric acid mono-hy-drate, g. | Alu-minum sul-fate, g. | Yield, g. | % In-soluble | $C_{\mu}^{+2}$ capacity, milli-equivalents/g. Before Hy-dro-lysis | $C_{\mu}^{+2}$ capacity, milli-equivalents/g. After Hy-dro-lysis |
|---|---|---|---|---|---|---|---|
| 10 | 7.0 | 3.0 | 0.02 | 8.4 | 100 | 0.24 | 1.76 |
| 11 | 6.0 | 4.0 | 0.02 | 7.8 | 96 | 0.39 | 2.28 |
| 12 | 5.0 | 5.0 | 0.02 | 7.9 | 78 | 0.50 | 2.79 |
| 13 | 4.0 | 6.0 | 0.02 | 7.2 | 89 | 0.50 | 3.10 |

EXAMPLE 14

The procedure of Example 12 was followed, but the heating stage was performed under vacuum at a temperature of 117° C. for 20 hours to give 9.3 g. of product 80% insoluble in water. After hydrolysis the product had a copper ion exchange capacity of 2.5 milliequivalents/g.

EXAMPLE 15

Employing mixtures of powdered cellulose and either citric acid, isocitric acid or aconitic acid at a level of from 30 to 70% by weight of the mixture and heating at a temperature of from 100 to 160° C. for up to six hours followed by aqueous alkali treatment of the resulting products at pH 8-11, provides carboxylated celluloses having ion exchange capacities of from 1.5 to 3.5 milliequivalents of cupric ion per gram.

EXAMPLE 16

A mixture of cellulose powder (6.5 g.), citric acid hydrate (3.5 g.) and aluminum sulfate (0.02 g.) was slurried with water (200 ml.) and after 30 minutes the wet mass was dried at 70° C. overnight to a moisture content of less than 2%. The product was milled and sieved through a 100 mesh screen. The fine powder was heated in a glass flask at 140° C. on an oil bath at a pressure of 50 mm. mercury (maintained by a vacuum pump), for a period of three hours to give a product (9.9 g.) which was 85% insoluble in water.

The product was washed with water (2×200 ml.) and suspended in 300 ml. 1M sodium bicarbonate. The mixture was stirred for 16 hours at room temperature and the product collected by filtration, washed several times with water and dried at 60° C. in a forced air oven. The product (8.0 g.) had an ion exchange capacity for cupric ions of 1.65 milliequivalents/g.

EXAMPLES 17-19

The procedure of Example 16 was followed using the following catalysts to give products with the ion exchange capacities relative to copper-ions as shown. In the absence of a catalyst, the product has a $Cu^{2+}$ capacity of 1.1 milliequivalents/g.

| Example | Catalyst | Weight, g. | $Cu^{2+}$ capacity, milli-equivalents/g. |
|---|---|---|---|
| 17 | $NH_2SO_3H$ | 1.0 | 1.8 |
| 18 | $NH_2SO_3H$ | 0.5 | 1.65 |
| 19 | $H_3PO_4$ (90%) | 0.2 | 1.5 |

EXAMPLE 20

The general procedure of Example 2 was followed but using newsprint (4 g.) and a quantity of crude, cell-free fermentation broth containing citric acid (6 g.). After reaction at 135° C. and 50 mm. mercury pressure for 2.5 hours, the product was hydrolyzed with sodium bicarbonate as described in Example 2 to give a final product having an ion exchange capacity for cupric ions of 2.74 milliequivalents/g.

EXAMPLE 21

A mixture of cellulose powder (4 g.) and aconitic acid (7.1 g. of 84% purity) was slurried with water, dried and heated at a temperature of 145° C. under a pressure of 50 mm. mercury as described in Example 16, to give a product (7.42 g.) which was 65% insoluble in water. The product was washed and hydrolyzed as before to give a product with an ion exchange capacity for cupric ions of 3.13 milliequivalents/g.

EXAMPLE 22

(A) Sawdust (80 g.) was added to a solution of citric acid monohydrate (125 g.) in demineralized water (100 ml.) and stirred to a smooth consistency. The wet product was dried in trays in a forced air oven at 90° C. to a moisture content of less than 5%.

(B) 56.9 g. of the product from (A) was reacted at 120°–138° C. in a rotary vacuum drier under a pressure of 66 mm. mercury for two hours to yield 52.1 g. of a product which was 63.7% insoluble in water indicating that the sawdust had reacted with 44% of its weight of citric acid.

(C) The crude product from (B) was suspended in demineralized water (400 ml.) and stirred for two hours. The product was collected by filtration, suspended in a solution of sodium carbonate (24.6 g.) in water (283 ml.) and stirred at room temperature for two hours. The product was collected by filtration, washed with water until free of residual sodium carbonate and dried in a vacuum oven overnight. The final product (35.0 g.) had an ion exchange capacity towards cupric ions of 3.04 milliequivalents per gram.

EXAMPLE 23

Sawdust (10.0 g.) citric acid (15.0 g.) and water (60 ml.) were mixed together and the wet mass dried overnight in an oven at 70° C. The product was heated in an oven at 140°–150° C. For three hours under atmospheric pressure using a slow bleed of air to remove water vapor formed during the reaction. The product (21.7 g.) was washed with water (50 ml.) and the residue suspended in 1M sodium bercarbonate solution (650 ml.) and stirred at room temperature for several hours. The product was collected by filtration, washed with water until free of sodium bicarbonate and dried at 70° C. The final product (13.0 g.) had an ion exchange capacity for cupric ions of 2.93 milliequivalents per gram.

EXAMPLE 24

The use of the citrated cellulose products as ion exchange materials is illustrated by the following tests: Various synthetic rinse waters were made up from laboratory reagents (usually metal chlorides) dissolved in deionized water. The citrated cellulose product of Example 16 was added to 50 ml. of the rinse water and stirred for one hour, the solution filtered and the residual metal ion concentrations (ppm) were measured by atomic absorption spectroscopy on the filtrates. The amount of resin used was calculated as 110% of the measured copper ion exchange capacity based on the total weights of metals in solution.

Similar results were obtained with the products derived from newsprint and sawdust.

| Synthetic Rinse water A | pH 4.0 | | | |
|---|---|---|---|---|
| | $Cu^{2+}$ | $Zn^{2+}$ | $Ni^{2+}$ | $Cd^{2+}$ |
| Initial concentration of metal ions in solution (ppm) | 50 | 50 | 30 | 30 |
| Final concentration after treatment with citrated cellulose (176 mg.) | 0.6 | 3.7 | 4.3 | 0.2 |

| Synthetic Rinse water B | as A but adjusted to pH 5.9 with sodium carbonate | | | |
|---|---|---|---|---|
| | $Cu^{2+}$ | $Zn^{2+}$ | $Ni^{2+}$ | $Cd^{2+}$ |
| Initial concentration of metal ions in solution (ppm) | 50 | 50 | 30 | 30 |
| Final concentration after treatment with citrated cellulose (176 mg.) | 0.6 | 2.5 | 0.3 | 0.3 |

| Synthetic Rinse water C | as A but adjusted to pH 10 with 10% calcium hydroxide and filtered | | |
|---|---|---|---|
| | $Cu^{2+}$ | $Zn^{2+}$ | $Cd^{2+}$ |
| Initial concentration of metal ions in solution (ppm) | 0.5 | 0.5 | 0.3 |
| Final concentration after treatment with citrated cellulose (180 mg.) | 0.0 | 0.0 | 0.0 |

| Synthetic Rinse water D | pH 4.9 | |
|---|---|---|
| | $Cu^{2+}$ | $Zn^{2+}$ |
| Initial concentration of metal ions in solution (ppm) | 400 | 10 |
| Final concentration after treatment with citrated cellulose (500 mg.) | 17.5 | 1.8 |

| Synthetic Rinse water E | pH 5.5 contains calcium (200 ppm) | | |
|---|---|---|---|
| | $Cu^{2+}$ | $Ni^{2+}$ | $Cd^{2+}$ |
| Initial concentration of metal ions in solution (ppm) | 20 | 10 | 10 |
| Final concentration after treatment with citrated cellulose (44 mg.) | 1.7 | 8.8 | 6.5 |

| Synthetic Rinse water F | |
|---|---|
| | $Hg^{2+}$ |
| Initial concentration of metal ions in solution (ppm) | 5.00 |
| Final concentration after treatment with citrated cellulose (25 mg.) | 0.21 |

EXAMPLE 25

A 1 liter sample of a commercial electroplating effluent was passed down a column (1.5 × 18.0 cm.) containing 5.0 g. of the citrated sawdust product of Example 22 at a flow rate of 7.5 ml./min. The composition of the eluate was monitored at 250 ml. fractions and the results are shown in the Table below:

| | | | Concentration, ppm | | | | | |
|---|---|---|---|---|---|---|---|---|
| Input | Vol., ml | pH | Cu | Ni | Cd | Zn | Fe | Ca |
| | 1000 | 3.7 | 10.0 | 91.0 | 1.7 | 48.0 | 26.0 | 50.0 |
| Eluate 1 | 250 | 6.7 | 2.2 | 0.0 | 0.0 | 0.0 | 0.0 | 0.0 |
| 2 | 250 | 6.4 | 2.2 | 0.0 | 0.0 | 0.0 | 0.0 | 0.0 |
| 3 | 250 | 6.1 | 1.9 | 0.6 | 0.0 | 0.3 | 0.0 | 13 |
| 4 | 250 | 5.8 | 1.9 | 9.9 | 0.3 | 8.0 | 1.0 | 100 |

EXAMPLE 26

A sample of "silver mud" from a mirror manufacturer containing residual silver, silver oxide and dextrose was dried, dissolved in 25% nitric acid at 70° C. and the solution filtered and the pH adjusted to 6.1 with 0.1M sodium hydroxide. The solution was passed down a 1.5 cm. diameter column containing the citrated sawdust product of Example 22 (3.75 g.). The column was washed with water and the absorbed silver (1.28 g. as $Ag^+$) was recovered quantitatively by elution with 1M nitric acid to give silver nitrate of 99.2% purity by Volhard titration.

We claim:

1. A process for the preparation of a carboxylated cellulose ion exchange material which comprises the steps of
   (a) heating a mixture of cellulose and a polycarboxylic acid selected from the group consisting of citric, isocitric and aconitic acid, said mixture containing from about 30 to 70 percent by weight of said acid, at a temperature of from about 100° to 160° C. while removing water therefrom until the cellulose has reacted with at least 20 percent of its own weight of acid; and
   (b) treating the product with an excess of aqueous alkali at a pH of from 8 to 11 until the ion exchange capacity of the material relative to cupric ions is at least 1.5 milliequivalents per gram.

2. A process according to claim 1 wherein said polycarboxylic acid is citric acid.

3. A process according to claim 1 wherein the cellulose is in the form of sawdust or waste newsprint.

4. A process according to claim 1 wherein said mixture contains from about 40 to 60 percent by weight of said acid.

5. A process according to claim 1 wherein said mixture is reacted at a temperature of from about 130° to 150° C.

6. A process according to claim 1 wherein the ion exchange capacity of the material relative to cupric ions is from about 1.5 to 3.5 milliequivalents per gram.

7. A process according to claim 1 wherein said mixture has a moisture content of less than 5 percent prior to said heating.

8. A process according to claim 1 wherein said heating is carried out under reduced pressure.

9. A process according to claim 1 wherein said heating is carried out in the presence of a catalytic amount of a catalyst selected from the group consisting of phosphoric acid, sulfamic acid and aluminum sulfate.

10. A process according to claim 9 wherein said catalyst is aluminum sulfate.

11. A process according to claim 1 wherein said alkali is sodium carbonate or sodium bicarbonate.

12. A carboxylated cellulose ion exchange material prepared by the process of claim 1.

13. A carboxylated cellulose ion exchange material according to claim 12 wherein the ion exchange capacity relative to cupric ions is from about 1.5 to 3.5 milliequivalents per gram.

14. A citrated cellulose ion exchange material according to claim 13.

15. A method of removing heavy metal ions from an aqueous solution containing said ions which comprises contacting said solution with a carboxylated cellulose ion exchange material prepared by the process of claim 1.

* * * * *